March 10, 1959

C. W. BOWLBY 2,876,551

PHYSICAL THICKNESS GAUGE

Filed Nov. 5, 1956

INVENTOR.
CLARENCE W. BOWLBY
BY
Reynolds, Beach & Christensen
ATTORNEYS

March 10, 1959

C. W. BOWLBY 2,876,551

PHYSICAL THICKNESS GAUGE

Filed Nov. 5, 1956

INVENTOR.
CLARENCE W. BOWLBY
BY
Reynolds, Beach & Christensen
ATTORNEYS

United States Patent Office 2,876,551
Patented Mar. 10, 1959

2,876,551

PHYSICAL THICKNESS GAUGE

Clarence W. Bowlby, Seattle, Wash., assignor to Boeing Airplane Company, Seattle, Wash., a corporation of Delaware Application November 5, 1956, Serial No. 620,483

8 Claims. (Cl. 33—147)

This invention relates to improvements in thickness gauges, and more particularly in the art of measuring physical wall thickness of elongated hollow specimens. The invention is herein illustratively described by reference to its presently preferred forms intended for the measurement of wall thickness of elongated nose radomes for aircraft; however, it will be recognized that the invention is not necessarily limited to the details of illustration.

In the course of manufacturing certain aircraft nose radomes, which may be of the order of ten feet long and may taper from a base diameter of the order of four feet to a sharply rounded tip, it is important to control physical wall thickness to a high degree of accuracy throughout the entire wall area. It is, therefore, essential to measure wall thickness throughout the radome and to perform this measurement as rapidly and accurately as possible, preferably by a scanning process in which a continuous recording of thickness or thickness deviation is made as position of the radome is progressively changed in its relation to the measuring instrumentality.

The conventional approach to measuring the wall thickness of such an article was to mount a micrometer or similar gauge on a support outside the radome where it could be manipulated and mount the micrometer anvil on an elongated arm adapted to project into the radome. The length of the arm, to span the length of the radome interior was necessarily great, however, and, with the anvil in contact with the radome surface, subjected the arm to variable deflection, giving rise to serious errors in measurements. Efforts to standardize the deflection of the anvil supporting arm as a preliminary to reading the micrometer for each measurement would necessarily greatly retard the measurement process, and virtually preclude a process of continuous rapid measurement effected by rotating the radome and moving it progressively lengthwise, relative to the measuring instrumentality, in order to cover its entire area for recording purposes. Variable deflection of the arm under these or other measuring conditions is virtually unavoidable if the anvil is to be maintained in contact with the radome surface as it must for accurate measurements, because such radomes are not perfectly symmetrical and cannot be moved, either in rotation or generally lengthwise thereof without some component of motion occurring parallel to the direction of alignment of the micrometer spindle and cooperating anvil. With articles as large and heavy as these radomes, it is practically impossible to maintain a perfectly constant pressure of contact between the radome surface and a rigid gauge anvil so as to insure constant anvil support deflection.

An object of the present invention is to provide a physical thickness gauge adapted for measuring the wall thickness of such radomes and of other large articles, particularly elongated hollow articles, which require at least one of the cooperating gauge elements to be carried by an elongated supporting arm or the like. In particular, the invention is directed to physical thickness measuring apparatus which overcomes the need for reliance upon a stationary gauge anvil held in contact with the radome surface for positional reference purposes. With the present invention the cooperating gauge elements contacting opposite sides of the radome wall do so yieldably and under very light pressure and remain under light pressure, insufficient to deflect the gauge supports appreciably, throughout variations in deflection of either or both gauge elements, hence, despite eccentricity or other irregularities of the radome form encountered during the measurement process, rapid scanning type thickness measurement is thereby made possible.

Another object of the invention is the provision of a physical thickness gauge which is adapted for the continuous measurement and, if desired, the recording of physical thickness of such radomes or other large articles, with speed and accuracy, and without need for complex mechanical or electrical apparatus or controls for eliminating the effect of gauge anvil deflection as in former devices.

As herein disclosed the invention comprises in combination means supporting the specimen in position for measurement, first and second gauge means having respective deflectable specimen contact elements, a separate support for each gauge means physically isolated from the specimen and specimen support to prevent strain or deflection of either said specimen or specimen support from deflecting the first or second gauge means, said gauge means supports positioning said first and second gauge means respectively with their contact elements in contact with corresponding points on respectively opposite sides of the specimen, and with said first and second gauge means being adapted to urge their respective contact elements yieldingly but continuously into contact with the specimen under very slight pressure, whereby the algebraic sum of the deflections of the gauge contact elements becomes related to the specimen thickness therebetween. Preferably said gauge means comprise electrical differential transformers having core elements moved by the associated gauge contact elements into varying overlapping relationships with the opposed sets of transformer windings, thereby to produce differential signals for the two gauges, which may be added together algebraically in order to produce a resultant representing specimen thickness. As herein disclosed such resultant is indicated by means of a third differential transformer, the core element of which is moved by servomechanism energized in accordance with the difference between the response of the third differential transformer and the algebraic sum of the responses of the first two differential transformers, whereby position of the core element in the third differential transformer becomes related to specimen thickness.

These and other features, objects and advantages of the invention will become more fully evident from the following description thereof by reference to the accompanying drawings.

Figure 1:
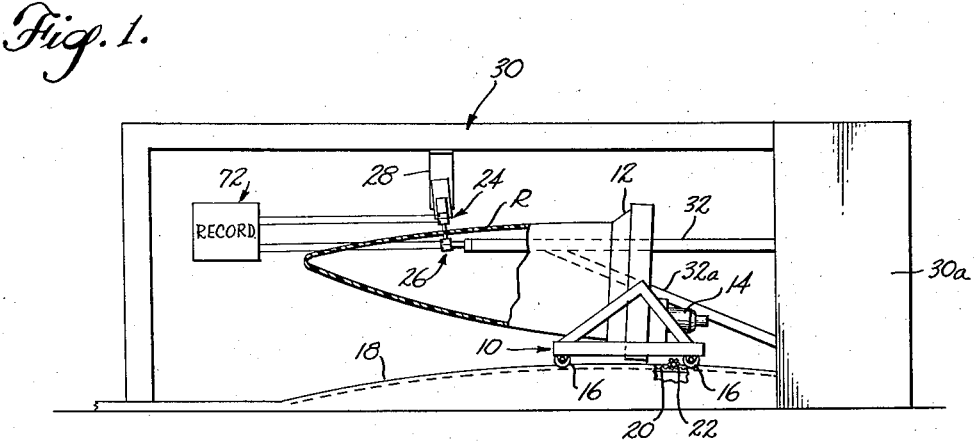
Figure 1 is a simplified side elevation view of the improved physical thickness gauge as adapted for the measurement of wall thickness of aircraft nose radomes on a progressive scanning and continuous thickness recording basis.
Figure 2:
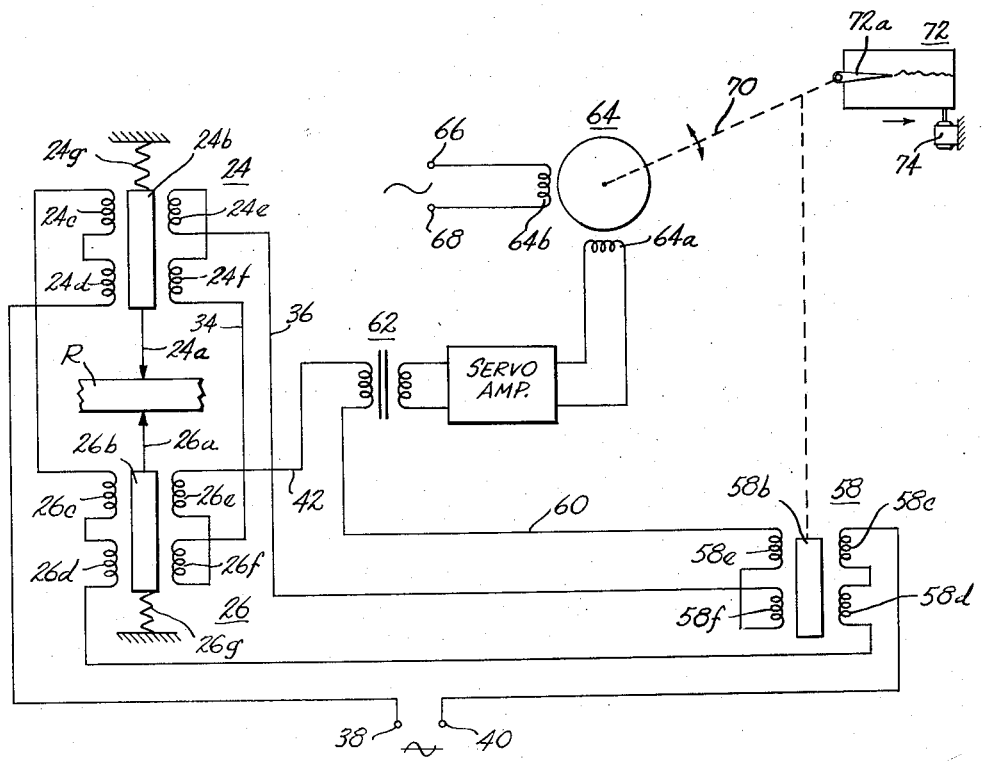
Figure 2 is a schematic diagram of the preferred form of gauge using differential transformers.
Figures 3, 4:
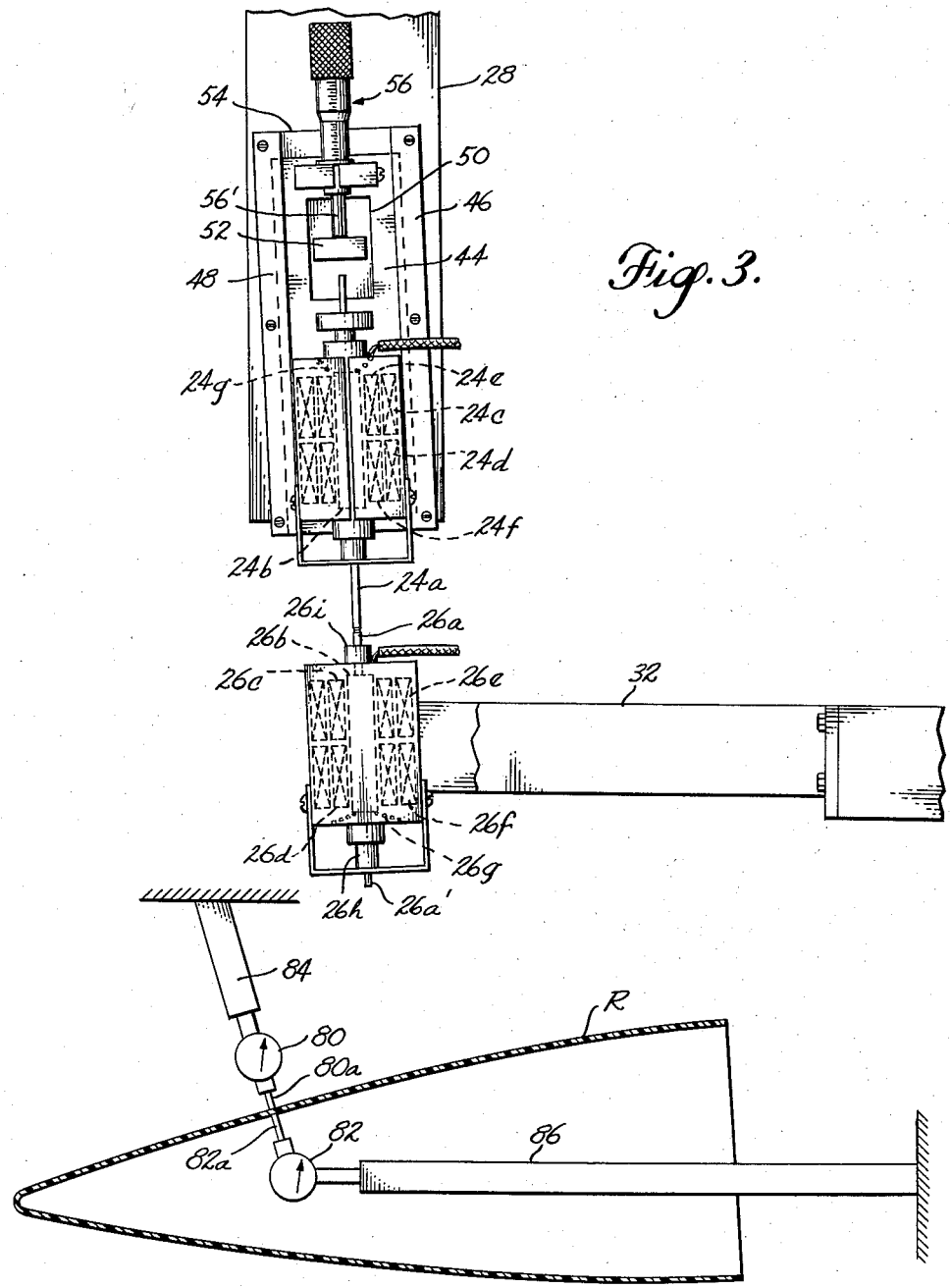
Figure 3 is an enlarged view showing the differential transformer instruments.
Figure 4 is a simplified view of an alternative physical thickness gauge employing mechanical dial type gauges.

Referring to Figures 1, 2 and 3, the typical aircraft nose radome R to be measured for physical wall thickness throughout substantially its entire area is of elongated ogival form. It is difficult by present day methods to mold or otherwise form these large figures of revolution with perfect uniformity as to wall thickness and it is therefore often necessary to grind off or add material in order to achieve the desired thickness. Dielectric thickness in terms of wave lengths at the operating frequency of the radar or other electromagnetic wave apparatus housed by the radome must also be determined and corrected in the course of manufacturing these radomes. However, the present invention deals only with physical thickness measurements.

The radome R is supported for measurement purposes in the illustrated embodiment by mounting the same on a carriage 10. The carriage has a rotary radome supporting ring 12 to which the base of the radome is securely fastened to rotate the radome about its longitudinal axis. A motor 14 connected by suitable gearing (not shown) to the supporting ring 12 revolves the radome at the desired speed. The carriage wheels 16 roll on curved tracks 18 having a gear rack 20 extending therealong engaged by a pinion 22 driven by the same motor 14 that rotates the radome. Thus longitudinal movement and rotary movement are coordinated so that the radome advances along the tracks a given distance with each revolution thereof insuring a uniform rate of surface scan of the radome relative to the measuring instrumentalities to be described. The track curvature conforms substantially to the longitudinal curvature of the radome itself on the side thereof opposite that nearest the tracks. Because of this relationship, the measuring instrumentalities, which are positioned to gauge wall thickness on the side remote from the tracks, remain in constant positional relationship with the surface area lying instantaneously between the instrumentalities in all positions of the radome along the tracks. Such instrumentalities comprise an upper or outer gauge means 24 and a lower or inner gauge means 26. The outer gauge means is mounted on a gauge support 28 maintained in fixed position by a rigid supporting frame 30. The inner gauge means 26 is mounted on an elongated cantilever support 32 having a brace 32a mounted on the end portion 30a of the rigid frame 30. The cantilever arm 32 has a length somewhat in excess of the length of the radome, so as to permit positioning of the inner gauge means 26 at any location from the base to the tip of the radome.

The outer gauge means 24 comprises a radome contact element or feeler 24a positioned by the gauge support 28 to contact the outside surface of the radome, and adapted for outward deflection thereby in a line which is substantially perpendicular to the radome surface at the point of contact therewith. The inner gauge means 26 has a similar contact element 26a positioned to contact the inside face of the radome wall at a point directly opposite the point of contact of the element 24a, and adapted to be deflected inwardly in a line coinciding with the line of deflection of the element 24a. In this embodiment of the invention the feeler elements 24a and 26a comprise rods which extend in alignment, and these are connected to the cores of differential transformers, such cores being designated 24b and 26b, respectively. The transformer cores, of ferromagnetic material, are moved by the respective radome contact elements to one side or the other of neutral positions which they normally occupy in relation to the sets of primary and secondary windings of the associated differential transformers, in the usual manner. Thus the differential transformer of the gauge means 24 comprises the two coaxially arranged primary windings 24c and 24d and cooperating secondary windings 24e and 24f. The secondary windings 24e and 24f are connected in serial relationship subtractively between the electrical conductors 34 and 36. The primaries 24c and 24d are energized by alternating current flowing through them in series relationship from input terminals 38 and 40. In the illustration the secondary 24e is arranged concentrically with the primary 24c as is the secondary 24f with respect to the primary 24d, with the core member 24b overlapping each such primary and secondary pair. Thus in the normal or neutral position of the core element 24b, as established by the radome contact 24a, the inductive coupling between each primary and its associated secondary is the same, resulting in application of zero difference voltage between the conductors 34 and 36 from secondaries 24e and 24f.

Similarly the differential transformer of inner gauge means 26 includes the pair of primaries 26c and 26d and cooperating secondaries 26e and 26f formed and arranged similarly to the corresponding elements of the upper gauge means. The secondaries 26e and 26f are serially connected in subtractive relationship between the conductors 34 and 42. Thus the voltage appearing between conductors 36 and 42 as a result of the induced voltages in the two sets of secondaries represents the algebraic sum of the differential voltage developed by secondaries 24e and 24f added to that developed by secondaries 26e and 26f.

The gauge contact element 24a of the outer gauge means is urged continuously and yieldably into contact with the radome surface under very light pressure by the light compression spring 24g. A similar spring 26g urges the inner gauge contact element 26a into contact with the inside face of the radome. The pressures of these springs are insufficient to produce any measurable reactionary deflection of the respective gauge supports 28 and 32. Consequently, any deflection of the gauge contact elements by the radome during its rotational and translational movements does not affect the accuracy of measurements. Moreover, the tracks 18 on which the radome carriage is supported are physically isolated from the gauge supports 30 and 32 insofar as movement or position of the carriage along the tracks may have any effect on the gauge positions.

As previously mentioned the inner gauge is stationarily mounted on the end of the gauge support arm 32 (Figure 3). The core member 26b is mounted on an elongated rod 26a' intermediate the ends of such rod and the rod is received for longitudinal sliding movement in the antifriction collars 26h and 26i mounted at lower and upper ends of the differential transformer. Such collars may be formed of Teflon or other low-friction material and may be suitably mounted on the casing of the differential transformer such as in the manner illustrated.

The upper gauge means differential transformer, of generally similar construction, is mounted on a slide plate 44 retained by guides 46 and 48 oriented to permit longitudinal sliding movement of the upper gauge means in a line parallel with the line of deflection of the contact elements 24a and 26a. The slide plate 44 has a window 50 therein through which projects a block 52 rigidly mounted on the backing plate 54 which is fixedly secured to or forms a part of the gauge support 28. A micrometer head 56 mounted on the slide plate 44 has its spindle secured to or abutted against the upper side of the block 52 so as to permit raising and lowering the entire upper gauge means bodily by manipulation of the micrometer.

In the preferred mode of operation of the physical thickness gauge herein disclosed the measurement which is made is not simply physical thickness of the radome wall but represents the difference between such thickness and the desired or normal thickness for such wall. To accomplish this latter type of measurement the micrometer 56 is adjusted so that the apparatus provides a zero indication when no radome is interposed between the contact elements 24a and 26a or when the radome between such contacts is precisely the correct thickness. Such micrometer adjustment is accomplished by advancing the contact elements initially into light contact with each other and then by manipulation of the micrometer 56 raising the upper gauge means by an amount equal to the required normal radome wall thickness.

In order to convert the algebraic sum of the differential voltages from the two differential transformers into a thickness indication or recording a third differential transformer 58 is used including primary windings 58c and 58d and associated secondary windings 58e and 58f. The primary windings are serially energized with the primary windings of the outer and inner gauge differential transformer primaries from the alternating voltage input terminals 38 and 40 as shown. The position of the ferromagnetic core element 58b of this third differential transformer determines the voltages induced in the secondary windings 58e and 58f, which are subtractively connected between the electrical conductors 36 and 60. Thus the voltage appearing between electrical conductors 42 and 60 represents the difference between the differential voltages of the secondaries 58e and 58f on the one hand and the algebraic sum of the differential voltages of the pairs of secondaries of the outer and inner gauge differential transformers on the other hand. This difference is applied to the primary of a transformer 62 whose secondary is connected to the input of a servoamplifier adapted to energize the control winding 64a of the reversible two-phase motor 64. The reference winding 64b of this motor is energized by alternating voltage applied to input terminals 66 and 68, which voltage is the same, as to frequency and phase, as that applied to the terminals 38 and 40. Through mechanical coupling means 70 preferably including speed reduction gearing (not shown) the armature of motor 64 is connected to move the core element 58b of differential transformer 58 and also to position the support for the recording pen 72a of thickness recorder 72.

The polarities of the connections to the two-phase motor 64 are such that the motor will move the core element 58b of differential transformer 58 in a direction to reduce the error voltage appearing between conductors 42 and 60 to zero. The motor is reversible in its direction and responds to one relative phase of error voltage between conductors 42 and 60 by moving the core element in one direction and to the opposite relative phase by moving the core element in the opposite direction, in accordance with well known principles of null seeking servomechanisms. The position of the core element therefore represents the algebraic sum of the differential voltages developed in the sets of secondary windings in the outer and inner gauge means, and the position of the recording pen 72a reflects that sum. The initial or normal position of the pen is that which is established by the servomotor when the gauge contact elements 24a and 26a are separated by a distance equal to the required radome wall thickness. This becomes the zero line on the graphic recording paper. Hence any deflections of the needle from this zero line represent departures of radome wall thickness from the required value, up or down, at the corresponding wall locations.

The recording paper in the recorder 72 is moved at constant rate, related to radome scan rate, by any suitable means, such as by a constant speed electric motor 74 of the synchronous type operating synchronously with the radome carriage motor 14 so that the thickness recording may be correlated with different successive measurement positions on the radome. For convenience the recorder is mounted at a remote location outside the radome.

In operation, the radome carriage is positioned initially so that the gauge contact elements 24a and 26a bear against opposite sides of the radome wall at one extremity or the other of the radome. Thereupon energization of the carriage motor 14 causes rotation of the radome and progressive advancement thereof along the carriage tracks to cause scanning of the radome surface in successive circumferentially extending zones by the gauge means while recording wall thickness variations in the recorder 72 at a corresponding rate of movement. Such scanning operation may be effected rapidly because there is no requirement for normalizing deflection of the gauge supports. After the recording operation is completed the record may be utilized either automatically or by manual inspection to locate the different places on the radome surface where wall thickness is either excessive or insufficient, for the making of corrections.

In the alternative and simplified embodiment shown in Figure 4 the radome R is positioned for measurement by suitable means (not shown) between mechanical gauge means perferably in the form of conventional dial gauges 80 and 82, respectively. The gauge 80 has a contact element 80a whereas the gauge 82 has a contact element 82a aligned with the element 80a. These contact elements are maintained in continuous contact with the radome surface by suitable means (not shown) with a light contact pressure insufficient to produce deflection of the outer and inner gauge supports 84 and 86, respectively. The principles governing the placement and mounting of the supports 84 and 86 and the gauge means which they carry are similar to those affecting the previous form of the invention. In this embodiment of the invention the dial gauges produce independent readings the algebraic sum of which is related to instantaneous physical wall thickness of the radome interposed between the gauge contact elements.

In either embodiment of the invention it will be noted that irregularities or dissymmetry of the radome will produce like deflections of the gauge elements and will not disturb the measurement represented by the algebraic sum of the readings. Moreover, such irregularities and dissymmetry will in no way affect the accuracy of the readings by causing deflection of the gauge supports inasmuch as these supports are physically isolated from the gauge contact elements due to the use of very light pressure of contact therewith, and furthermore the gauge supports are physically isolated from the support or carriage for the radome.

These and other aspects of the invention will be evident from the foregoing description of the preferred mode of practicing the same.

I claim as my invention:

1. Apparatus for measuring the physical thickness of a specimen, comprising in combination means to support the specimen in position for measurement, a first gauge means having a deflectable specimen contact element, a first gauge support positioning said first gauge means with its contact element in contact with one side of the specimen in measurement position, for deflection thereby, a second gauge means having a deflectable specimen contact element, a second gauge support positioning said second gauge means with its contact element in contact with the opposite side of the specimen in measurement position, for deflection thereby, at a point directly opposite and in deflection alignment with the first gauge means contact element, said first and second gauge means being adapted to urge their respective contact elements continuously into contact with the specimen under contact holding pressure and to permit yielding of such elements, said first and second gauge means producing separate responses in relation to deflection of their respective contact elements whereby the algebraic sum of such responses is related to the specimen thickness between the contact elements, said first and second gauge supports being physically isolated from the specimen and specimen support to prevent strain or deflection of either said specimen or specimen support from deflecting the first or second gauge means, said specimen support being adapted to permit movement of the specimen being measured in a direction transverse to the deflection alignment of the contact elements while said elements remain in continuous contact with opposite sides thereof, and indicator means connected to both of the gauge means, said indicator means comprising means simultaneously responsive to both gauge means and operable to compute the algebraic sum of the responses of said gauge means and to operate said indicator means to indicate such sum.

2. The apparatus defined in claim 1, and head means on one of said gauge supports movably supporting the associated gauge means theron and adapted to permit bodily adjustment thereof toward and from the opposing gauge means, said head means including a calibrated scale for indicating position of the gauge means supported thereby in terms representing units of thickness of the specimen.

3. Apparatus for measuring the physical thickness of a specimen, comprising in combination means to support the specimen in position for measurement, a first gauge means having a deflectable specimen contact element, a first gauge support positioning said first gauge means with its contact element in contact with one side of the specimen in measurement position, for deflection thereby, a second gauge means having a deflectable specimen contact element, a second gauge support positioning said second gauge means with its contact element in contact with the opposite side of the specimen in measurement position, for deflection thereby at a point directly opposite and in deflection alignment with the first gauge means contact element, said first and second gauge means being adapted to urge their respective contact elements continuously into contact with the specimen under very slight pressure and to permit yielding of such elements, said first and second gauge means producing separate responses in relation to deflection of their respective contact elements whereby the algebraic sum of such responses is related to the specimen thickness between the contact elements, said first and second gauge supports being physically isolated from the specimen and specimen support to prevent strain or deflection of either said specimen or specimen support from deflecting the first or second gauge means, and recording indicator means responsively connected to both of the gauge means to indicate the algebraic sum of the responses thereof, said specimen support means being adapted to move the specimen continuously between the first and second gauge contact elements substantially perpendicularly to the line of deflection thereof.

4. Apparatus for measuring the physical thickness of a specimen, comprising in combination means to support the specimen in position for measurement, a first differential transformer gauge means having a pair of primary windings, a pair of secondary windings connected subtractively, a core element movable in relation to said windings to vary the coupling ratio between one primary and its secondary equally and oppositely to the variation of the coupling ratio between the other primary and its secondary winding, and a deflectable specimen contact element connected to said core element to move the same, a first gauge support positioning said first differential transformer gauge means with its contact element in contact with one side of the specimen in measurement position, for deflection thereby, a second differential transformer gauge means similar to the first, a second gauge support positioning said second differential transformer gauge means with its contact element in contact with the opposite side of the specimen in measurement position, for deflection thereby at a point directly opposite and in deflection alignment with the first gauge means contact element, a voltage source connected for energizing said primary windings, said first and second gauge means being adapted to urge their respective contact elements continuously into contact with the specimen under very slight pressure and to permit yielding of such elements, electrical indicator means, and circuit means electrically interconnecting the two pairs of secondary windings with said indicator means whereby the latter responds to the algebraic sum of the difference voltages induced in the pairs of secondary windings, said algebraic sum being related to specimen thickness, said first and second gauge supports being physically isolated from the specimen and specimen support to prevent strain or deflection of either said specimen or specimen support from deflecting the first or second gauge means.

5. The apparatus defined in claim 4, wherein the electrical indicator means comprises a third differential transformer having a pair of primary windings, a pair of secondary windings connected subtractively, and a core element movable in relation to said windings, electrically energizable servo means connected to said latter core element to move the same in either direction in accordance with energization of said servo means, means to energize the last mentioned primaries, and circuit means energizingly connecting said latter pair of secondary windings and the first two mentioned pairs of secondary windings to said servo means with relative polarities producing movement of said last mentioned core element in a sense to nullify the difference between the differential voltage of the secondary windings of the third differential transformer and the algebraic sum of the differential voltages of the pairs of secondary windings of the first and second differential transformers, whereby the position of the core element in the third differential transformer is related to specimen thickness.

6. Apparatus for measuring the physical wall thickness of an elongated hollow specimen, comprising in combination means to support the specimen in position for measurement, a first gauge means having a deflectable specimen contact element, a first gauge support positioning said first gauge means with its contact element in contact with a point on the inside of said specimen in measurement position, for deflection thereby, said first gauge support comprising an elongated arm adapted to project into the interior of the specimen generally throughout the length thereof, a second gauge means having a deflectable specimen contact element, and a second gauge support positioning said second gauge means with its contact element in contact with the opposite side of the specimen in measurement position, for deflection thereby at a point directly opposite and in deflection alignment with the first gauge means contact element, said first and second gauge means being adapted to urge their respective contact elements continuously into contact with the specimen under very slight pressure and to permit yielding of such elements, said first and second gauge means producing separate responses in relation to deflection of their respective contact elements whereby the algebraic sum of such responses is related to the specimen thickness between the contact elements, said first and second gauge supports being physically isolated from the specimen and specimen support to prevent strain or deflection of either said specimen or specimen support from deflecting the first or second gauge means.

7. The apparatus defined in claim 6, and remote indicator means responsively connected to both of the gauge means to indicate the algebraic sum of the responses thereof at a location remote from said gauge means.

8. The apparatus defined in claim 7, wherein the support includes means to revolve the specimen about the longitudinal axis thereof, and means to move the specimen progressively generally lengthwise thereof while maintaining a substantially constant angular relationship between the line of deflection of the gauge elements and the specimen wall at its point of intersection thereby.

References Cited in the file of this patent

UNITED STATES PATENTS

| | | |
|---|---|---|
| 2,563,254 | Lewis | Aug. 7, 1951 |
| 2,633,642 | Levesque | Apr. 7, 1953 |
| 2,691,826 | Breisch | Oct. 19, 1954 |